(12) United States Patent
Rajasekar et al.

(10) Patent No.: US 8,553,520 B2
(45) Date of Patent: Oct. 8, 2013

(54) SYSTEM AND METHOD FOR ECHO SUPPRESSION IN WEB BROWSER-BASED COMMUNICATION

(75) Inventors: Badri N. Rajasekar, San Francisco, CA (US); Chuo-Ling Chang, Palo Alto, CA (US); Gaurav Gupta, San Francisco, CA (US); Bernd Girod, Stanford, CA (US); Yang Cao, Campbell, CA (US)

(73) Assignee: TokBox, Inc.

( * ) Notice: Subject to any disclaimer, the term of this patent is extended or adjusted under 35 U.S.C. 154(b) by 219 days.

(21) Appl. No.: 13/034,714

(22) Filed: Feb. 25, 2011

(65) Prior Publication Data

US 2011/0235499 A1 Sep. 29, 2011

Related U.S. Application Data

(60) Provisional application No. 61/307,848, filed on Feb. 25, 2010.

(51) Int. Cl.
*H04J 3/10* (2006.01)
(52) U.S. Cl.
USPC ........... 370/201; 370/260; 370/261; 370/263; 379/202.01
(58) Field of Classification Search
USPC .................................. 370/201, 260–263, 286
See application file for complete search history.

(56) References Cited

U.S. PATENT DOCUMENTS

| 5,436,896 | A  | * | 7/1995 | Anderson et al. | 370/260 |
|---|---|---|---|---|---|
| 5,530,699 | A  | * | 6/1996 | Kline | 370/260 |
| 6,940,826 | B1 | * | 9/2005 | Simard et al. | 370/260 |
| 2003/0002482 | A1 | * | 1/2003 | Kubler et al. | 370/352 |
| 2006/0088007 | A1 | * | 4/2006 | Jalali et al. | 370/334 |
| 2008/0031437 | A1 | * | 2/2008 | Rey | 379/202.01 |

* cited by examiner

*Primary Examiner* — Hassan Kizou
*Assistant Examiner* — Tejis Daya
(74) *Attorney, Agent, or Firm* — Gard & Kaslow LLP (57) ABSTRACT

A system and method for performing echo suppression on a server in browser-based online audio conferences without downloading or installing software on a participant's computing device is disclosed. Streams of audio communication data from the participants in an audio conference are received at the server. An echo suppression application determines the first party that speaks by analyzing the streams to locate speech data, and assigns that party as the "owner" of the audio channel. The speech data is sent to the other participants in the conference. The application then determines whether newly received audio from the owner of the channel is new speech; if so, then the party remains the owner of the channel, and the new speech data is also sent to the other parties in the conference. The channel is surrendered if no new speech is received from the owner in a defined period, and the next party that speaks becomes the new owner of the channel. The other audio data from the participants is replaced by silence.

17 Claims, 3 Drawing Sheets

SYSTEM AND METHOD FOR ECHO SUPPRESSION IN WEB BROWSER-BASED COMMUNICATION

This application claims priority from Provisional Application No. 61/307,848, filed Feb. 25, 2010, which is incorporated by reference in its entirety.

FIELD OF THE INVENTION

The present invention relates generally to web-browser based audio communication. More specifically, the invention relates to echo suppression in such communication.

BACKGROUND OF THE INVENTION

In recent years the increased availability and use of the internet has also seen the increased use of IP-based (Internet Protocol) audio and video communication tools, such as VOW (Voice Over Internet Protocol) calling and "webcams," i.e., cameras for online use. These tools allow users to conveniently talk with each other and have video conferences online, often more economically than traditional land-line and mobile phones, or other video conferencing systems.

Many of the available IP-based audio and video communication systems either use specialized (and often expensive) hardware or require specialized software that must be downloaded and installed on a computing device. However, an increasing number of audio and video communication applications are available that operate entirely within a web browser (such as Internet Explorer from Microsoft, Safari from Apple, Chrome from Google, Firefox from the Mozilla Foundation, etc.) without the need for specialized hardware or software. Since most computing devices can use a browser, this increases the availability of such audio and video communications for many users.

While the wide distribution and convenience of such web browser-only applications make it easier for users to communicate with each other, the use of such applications generally comes with certain audio artifacts and quality problems. The most common and important among these defects is that of "acoustic echo," which often makes conversation difficult.

An acoustic echo occurs because on most computing devices the built-in speaker and microphone are too close to each other. In a call between parties A and B, when A speaks the speech comes out a speaker on B's device, and is then captured by B's microphone and transmitted back to A and possibly to other computing devices that are participating in the communication session, and is perhaps also amplified by B's microphone. The sound is then similarly played on the speakers of the other parties, and the process may repeat, thus forming a feedback loop and generating a gradually amplifying echo effect.

Prior systems have dealt with this by "echo cancellation," performed by the specialized hardware or software used for communication. Hardware echo cancellation generally removes the echo from the audio signal, but requires significant computation which is often an expensive operation in software in real time. Accordingly, many software applications do not "cancel" the echo as much as suppress it by simply turning off any signal containing an echo. In either case, this type of echo cancellation or echo suppression is typically done in the user's computing or telephony device.

It is very difficult to suppress an audio echo in browser-only applications. This is due to the fact that unlike many devices which have direct access to the audio and video signals which pass through them, applications that operate through a browser generally have only a very limited ability to manipulate the audio and video data that is captured by a microphone and camera of the computing device, i.e., the application typically merely transmits the audio and video data as encoded by the software for the microphone or camera without modifying the data. This is due to the limitations imposed by the web browser to ensure security when accessing content delivered through the web.

This causes some users to avoid browser-only applications and instead use applications with specialized software installed on the computing device, since some such applications are able to access the audio signal and apply an echo cancellation or suppression algorithm directly on the user's computing device.

A common type of echo suppression is the use of a "half-duplex" approach in which only one participant can transmit audio at any one time, thus preventing the feedback loop. Half-duplex is used widely in many of the analog and digital telephones used in the public switched telephone network (PSTN) as well as in VOIP networks, as well as in many cellular telephones. Even some of the IP-based specialized software applications cause the computing device to act as a "soft phone," thus using half-duplex as well as other techniques for echo suppression.

However, while half-duplex is very effective for telephone devices, it is difficult to implement in browser-only applications. This is due to the fact that, as stated above, there are limitations on the ability of the browser-based applications to modify the audio data to remove the effect of an echo.

Alternatively, users who still prefer to use the browser-only applications may use other approaches to overcome the difficulties caused by acoustic echo. One such approach is to use a headset that plugs in to the computing device, so that the microphone does not pick up the speaker output, which goes directly to the user's ear. This is inconvenient if there is more than one person at a given location.

Another approach is to ask all participants except the speaker to mute their microphones; however, this too is not only inconvenient when switching speakers, but may still cause echoing if one participant activates a microphone to speak before the current speaker is finished. Alternatively, rather than having to mute the microphone, it is possible to introduce a "push-to-talk" button on the web page to let users control who is talking, similar to the use of a walkie-talkie, although this suffers from the same problems as muting.

For these reasons, the solutions that rely on specialized hardware or software at the user location, or on performing echo cancellation or suppression in the computing device, fail to provide optimal echo cancellation or suppression in browser-based audio or video conferences.

SUMMARY OF THE INVENTION

A system and method is disclosed for a server-based audio echo suppression system for use with web browser based web video and audio communication without downloading or installing software on the computing device.

One embodiment of the invention describes a method of suppressing echoes in an online audio conference, comprising: receiving at a server a plurality of audio streams from a plurality of users participating in the conference, each user operating a device that has a microphone and that sends to the server a stream of packets of audio data representing the sound received at the microphone; testing the packets in the order received at the server to identify the first packet that contains audio data indicative of speech by a user; designating the stream containing the identified first packet containing speech data as the active stream; setting the streams other than the active stream to silence; and distributing the streams to the devices of the identified users.

In another embodiment of the invention, the method of suppressing echoes further comprises testing subsequent packets in the active stream to see if audio data in the subsequent packets represents speech received at the microphone of the user device within a predefined time of the speech represented in the first identified packet; if the subsequent packets in the active stream represent speech received at the microphone within the predefined time, maintaining the stream as the active stream; and if the subsequent packets in the active stream do not represent speech received at the microphone within the predefined time, testing the packets received at the server for the next packet that contains audio data indicative of speech by a user and designating the stream containing the next packet containing audio data as the new active stream.

Another embodiment of the invention describes a system for suppressing echoes in an online audio conference, comprising: an input means for receiving a plurality of streams of packets of audio data, each stream corresponding to the sound generated by one of a plurality of participants in the conference; a processor configured to test the packets in the order received to identify the first packet that contains audio data indicative of speech by a participant, designate the stream containing the identified first packet containing speech data as the active stream; replace the streams other than the active stream with streams of packets representing silence; and an output means for distributing the streams to the participants.

Still another embodiment of the invention describes a non-transitory computer-readable medium having embodied thereon a program, the program being executable by a processor to perform a method comprising the steps of: receiving at a server a plurality of audio streams from a plurality of users participating in the conference, each user operating a device that has a microphone and that sends to the server a stream of packets of audio data representing the sound received at the microphone; testing the packets in the order received at the server to identify the first packet that contains audio data indicative of speech by a user; designating the stream containing the identified first packet containing speech data as the active stream; setting the streams other than the active stream to silence; and distributing the streams to the devices of the identified users.

DETAILED DESCRIPTION OF THE INVENTION

The present application describes a system and method for a server-based audio echo suppression system for use with web browser-based audio communication. By processing the audio signal in a central location, the desired echo cancellation is achieved without specialized hardware or software at the computing device. The invention thus takes advantage of the broad availability of browsers to promote easy audio and video communication with improved audio quality.

In general, the invention includes the steps of intercepting the voice communication data from participants in an audio or video conference at a central media server, determining the first party that speaks by analyzing the voice communication data and background noise, assigning that party as the "owner" of the audio channel, compensating for speech patterns such as pauses and intervals between words to determine whether the party should remain the owner of the channel, and distributing the speech data from the channel owner to all parties in the conference. Newly received audio from the channel owner is examined, and if it is new speech, the owner retains the channel. If no new speech is received from the channel owner in a predefined time period, then the next party who speaks becomes the new owner of the channel. Audio other than that from the channel owner is replaced by silence or a low level comfort noise to prevent echoes.

The invention thus obtains the advantages of a half-duplex approach by only allowing one speaker at a time. However, the described system and method overcomes the problems of implementing such an approach in the browser environment by intercepting and processing audio data from the browser-based communications application at a media server through which the data is routed to accomplish echo cancellation.

Figure 1:
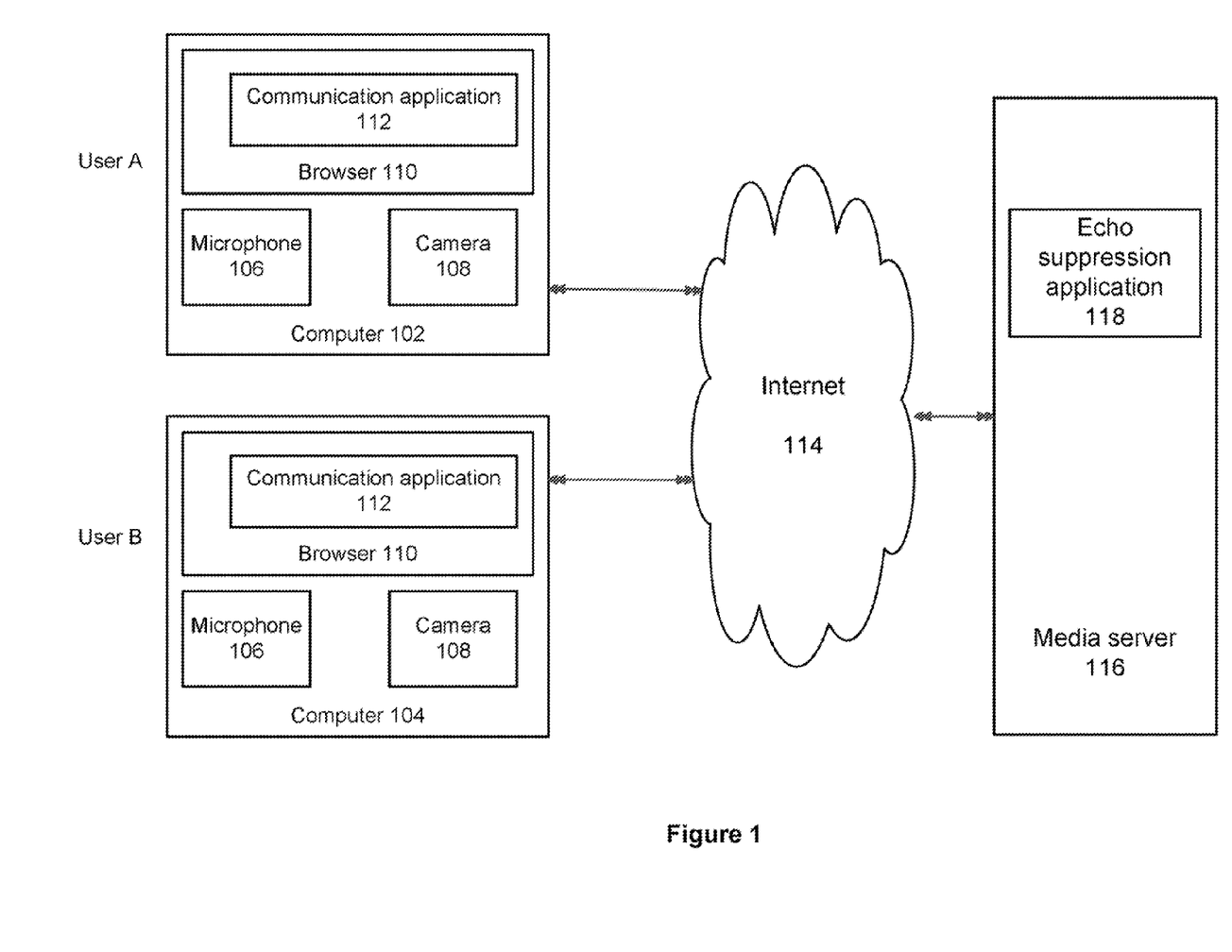
FIG. 1 is a block diagram of a system for performing echo cancellation in a web-browser based communication system according to one embodiment of the invention.

FIG. 1 shows a block diagram of a system for performing echo suppression in a web-browser based communication system according to one embodiment of the invention. Users A and B participate in an audio or video conference by using computing devices such as personal computers 102 and 104. Each of personal computers 102 and 104 has a microphone 106 and, if desired, a video camera 108. Each personal computer 102 and 104 also has installed on it a web browser 110, and each web browser runs a communication application 112, such as OpenTok from TokBox. Users A and B talk to each other by using the microphones 106 and cameras 108 on their respective computers 102 and 104. While two participant users are illustrated here; there may be more than two participants in a conference.

The web browser communication application 112 captures the audio and video data from the microphone 106 and camera 108 on each computer. In some embodiments, each communication application 112 uses an application programming interface (API) to capture the audio and video data; in one embodiment, the API is provided by Flash Player from Adobe. Flash Player then uses a coder/decoder ("codec") to encode the digital data received from the microphone 106 and camera 108 into a stream of packets for transmission.

The communication application 112 transmits the stream of encoded packets of audio and video data over the internet 114 to a media server 116. In one embodiment, the media server is a Wowza Media Server from Wowza Media Systems. An API such as the Adobe Flash Player API may also be used to send the stream of encoded packets of audio and video data to the media server 116.

The media server 116 is capable of receiving a plurality of streams of audio and video data, one from each of the participants in the conference, and forwarding the stream from each participant to each other participant. In the present invention, an echo suppression application 118 runs on the media server, intercepting the audio data and processing it as described further herein. The echo suppression application 118 then returns the processed audio data to the media server software, which then streams the audio and video data back to the participants, here users A and B. While two participating users A and B are illustrated here, more than two participants may be accommodated in the same fashion.

Figure 2:
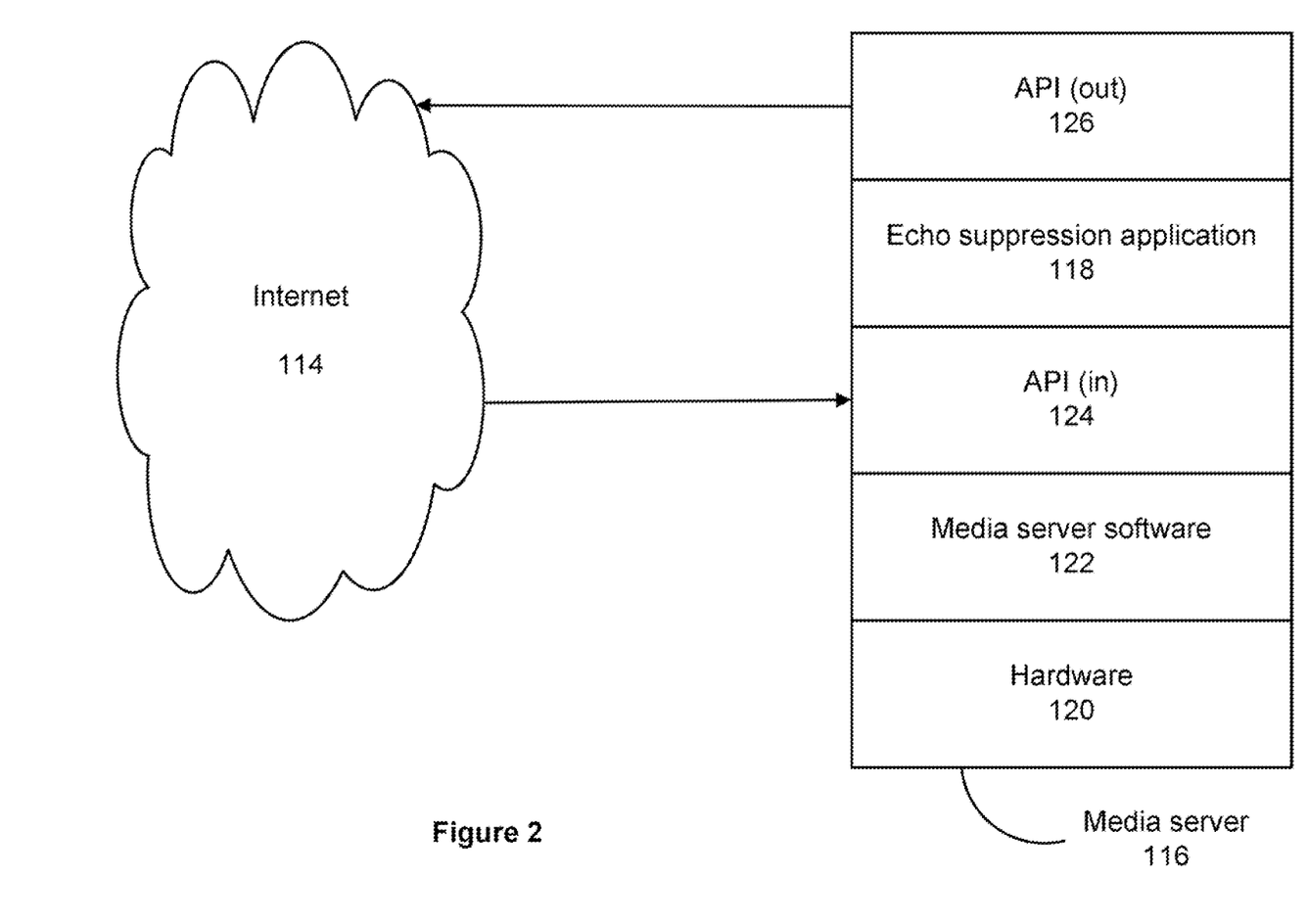
FIG. 2 is a block diagram of a media server in communication with the internet according to one embodiment of the present invention.

FIG. 2 is a block diagram of media server 116 according to one embodiment of the invention. Media server 116, such as the Wowza Media Server, comprises hardware including a processor running the media server software 122. The media server software includes input and output means, such as APIs 124 and 126, for connecting to the internet 114 and receiving incoming audio (and video) data from data sources, such as personal computers 102 and 104 in FIG. 1, and outputting the audio (and video) data to the intended destinations, in this case again personal computers 102 and 104.

The echo suppression application 118 is installed on the media server 116, and as stated above intercepts the audio data after it is received by the media server and processed by the API for incoming audio data. The data is processed as described herein, and then passed to the media server API that handles outgoing data, and from there streamed to the appropriate receiving user or users.

The Wowza Media Server has the ability to take the incoming streams containing audio, video and data packets from each of the participants and forward them to the other participants in the conference. With the use of additional application modules developed using the Wowza Integrated Development Environment (IDE), the incoming packets may be accessed and processed so that they may be altered before being forwarded. However, any server having such capabilities may be used.

In one embodiment, the method of the present invention defines an audio "channel" for the conference. Only one of the received streams of audio data may "occupy" the channel at a given time, and the audio stream occupying the channel is the only one distributed to the participants (other than the participant generating the stream). If the channel is unoccupied, such as at the beginning of a conference, the audio stream that provides the first received packet that is determined to contain speech occupies the channel, and the participant on the device that provides that stream is thus the "owner" of the channel, and only the stream of audio data from that device will be transmitted to the other participants by media server 118. This prevents more than one user from being heard simultaneously, since one packet will always arrive at the media server first.

Once an audio stream occupies the channel, it retains ownership of the channel as long as additional packets containing speech are received within a specified period of time that allows for gaps between words that occur in "normal" speech and for the time it takes for the packets to make a round trip between the source computing device and the server. If additional packets representing speech are not received within such time, then the channel is again considered unoccupied, and the next packet that contains speech takes ownership of the channel for the device that originated that next speech packet.

Figure 3:
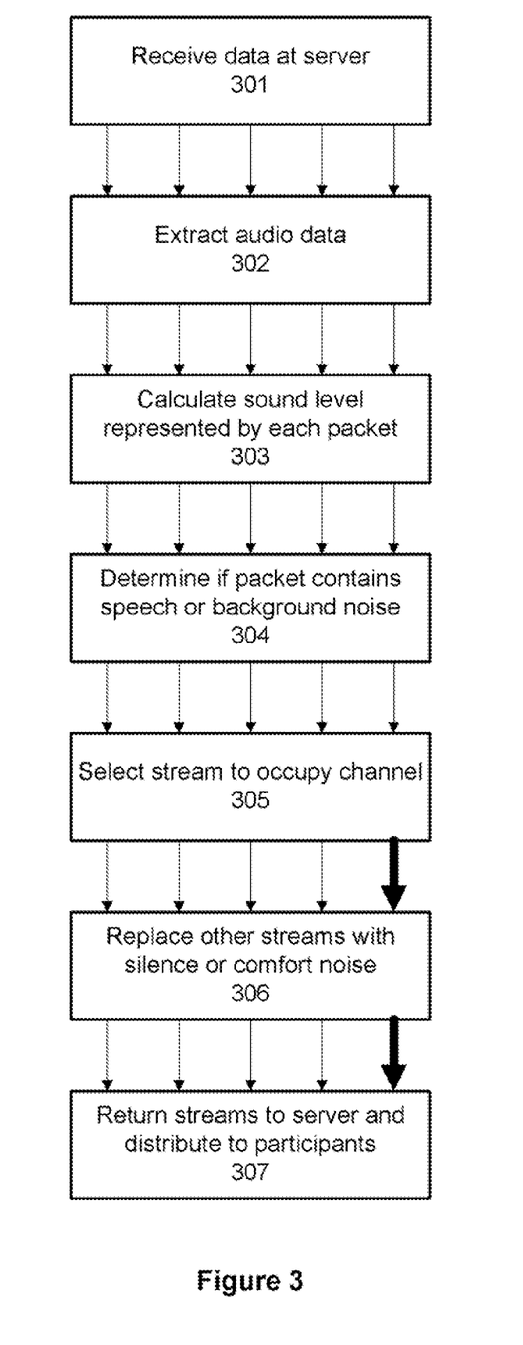
FIG. 3 is an illustration of the audio data flow and echo suppression in a media server according to one embodiment of the present invention.

FIG. 3 is an illustration of the steps of such a method of echo suppression in the media server 116 according to one embodiment of the invention. An audio or video conference is defined for a plurality of participants who communicate with each other as a group. As above, each user has a computing device running a browser, and within each browser a communication application runs that collects audio and/or video data from the computing device's microphone and/or camera, encodes the data into packets, and provides the stream of packets to the media server 116.

The media server 116 receives the data streams from all of the participants in the conference. In particular, the data stream from each participant contains a set of audio packets representing the audio collected by the microphone at that participant's computing device. The arrows on FIG. 3 represent the audio streams from the participants in the conference. While five audio streams are shown, there may be more or fewer audio streams.

The incoming data streams related to the conference are received by the API on the media server at step 301, and the streams of audio data are extracted and fed to the echo suppression application 118 at step 302. Each conference is separately treated for echo suppression. At step 303, the echo suppression application 118 looks at the audio packets in the streams in the order the packets are received by media server 116 to calculate the sound level of the sound represented by the packet, and at step 304 determines whether each audio packet contains speech or merely background noise. These steps are described in more detail below.

The echo suppression application then determines at step 305 which of the incoming audio streams should occupy the channel; as illustrated by the heavier arrow, a single audio stream has been selected to occupy the channel. At step 306, any incoming audio stream that is not occupying the channel is replaced by a zero energy audio signal, i.e., a stream of "zero" or "silence" packets, as indicated by the dashed arrows. Alternatively, it is possible to replace the audio streams that do not occupy the channel with low level audio signals or "comfort packets" of low level comfort noise that are too low to cause a feedback loop echo. It is believed that some encoders will create such comfort packets even when fed a string of zero inputs.

At step 307, the echo suppression application 118 returns the streams to the media server 116 software. Only the stream occupying the channel will have meaningful audio data; the remaining streams will contain data representing either silence or low level comfort noise. Media server 116 then distributes the streams to all of the conference participants using its outgoing API. The participants thus effectively receive only the single audio stream containing speech that has been selected to occupy the channel.

It may be seen that steps 302 to 306 constitute the echo suppression performed by echo suppression application 118, while the receipt and distribution of the streams in steps 301 and 307 are performed by the software on media server 116 as it would be if there was no echo suppression.

The encoding of the audio packets will now be explained in more detail. As above, in one embodiment Adobe Flash Player is used as to capture audio data from the microphone and to encode it in a stream of packets for transmission to the media server 116. In such an embodiment, Flash Player also decodes the audio data received from the media server for playback on the computing device.

In one embodiment, the audio samples are encoded using Speex, an audio codec supported by Flash Player and specifically targeted at VOIP applications and podcasts, rather than at cellular telephony. It is said to be optimized for high quality speech and low bit rate, robust to lost packets but not corrupted ones, and includes an audio compression format. One of ordinary skill in the art will appreciate that other codecs may also be used, and the advantages and disadvantages of each.

In this embodiment, the Speex module encodes and compresses the live audio samples captured from the microphone into the stream of audio packets to be sent to the media server. The following settings may be used for the microphone object in Flash Player with the Speex codec to control how the audio samples are captured and compressed:

Microphone encodeQuality=6
Microphone rate=16
Microphone framesPerPacket=1

Using these settings, the audio samples are captured at 16 kHz, i.e., 16000 samples per second, and each sample is represented by 16 bits. Each audio frame contains 20 ms of audio samples, resulting in 320 samples per frame, each represented by 16 bits, for a total of 640 bytes per frame. This in turn is encoded and compressed using the Speex codec into a 53-byte packet when the encode quality is set to 6. The 53-byte packet contains a 1-byte Flash header and 52 bytes, i.e., 412 bits, of Speex payload, corresponding to encoding the audio at 20,600 kbps (20600 bits/sec×20 ms=412 bits). See, e.g., The Speex Codec Manual, Version 1.2 Beta 3, Dec. 8, 2007, Table 10.2, p. 35, attached hereto as Appendix 1.

It has also been found that the Speex implementation in Flash Player automatically encodes audio samples using quality 0 if it determines that the samples do not represent voice activity but are likely to be background noise, in order to save bandwidth. The resulting audio packet using quality 0 is 1.1 bytes long, consisting of a 1-byte Flash header and 79 bits of Speex payload, as in this situation the audio is encoded at only 3,950 kbps, rather than 20,600 kbps. See also Appendix 1 hereto (The Speex Codec Manual, Version 1.2 Beta 3, Dec. 8, 2007, Table 10.2, p. 35).

This feature of Speex is also used to generate the "zero" or "comfort" packets that replace the audio packets that are to be suppressed when they do not occupy the channel. The packets are generated by creating a 20 ms frame of audio containing 320 audio samples as above, but with all of the samples set to a value of 0, and then encoding them with the encode quality set to 0 so that the resulting audio packet is again 11 bytes long including the 1-byte Flash header.

As above, it is determined whether an incoming packet contains voice speech; a general term for this is voice activity detection (VAD). One of skill in the art will appreciate that there are a number of VAD techniques that may be used with the present invention. One of the simplest VAD techniques is a simple volume based approach, in which the sound level of each incoming packet is calculated and compared to a threshold.

To determine the sound level associated with the audio samples in an audio packet, a conventional approach is to first decode the audio packet to restore the audio samples, and then compute the root-mean-square (RMS) value of these samples as an indication of the sound level. In one embodiment of the present invention, a different approach is used rather than this conventional approach, in order to reduce the computation load at the server. Instead, the sound level of a packet is determined directly in the compressed domain without having to decode the packet.

In the Speex codec, when the encode quality is set to 0, resulting in 11-byte packets as described above, a mode known as Narrowband Mode 1 is used. See, e.g., The Speex Codec Manual, Version 1.2 Beta 3, Dec. 8, 2007, Table 9.2, p. 33, attached hereto as Appendix 2. When the encode quality is set to 6, resulting in the 53-byte packets described above, another mode known as Narrowband Mode 5 is used. The bit allocation in each of these Narrowband Modes is listed in Table 9.1 of The Speex Codec Manual, Version 1.2 Beta 3, Dec. 8, 2007, p. 32, attached hereto as Appendix 3.

In the Narrowband Modes, the open-loop excitation gain (OL Exc Gain) is represented by 5 bits, thus allowing 32 levels (0-31). This gain value is used as an indication of the sound level because it is essentially the root mean square (RMS) value of the audio samples expressed in the logarithmic domain. The open-loop excitation gain is stored in the 5 bits starting from the 35th bit and the 36th bit of the Speex payload for Narrowband Mode 1 and Narrowband Mode 5 respectively. See Appendix 3 hereto (The Speex Codec Manual, Version 1.2 Beta 3, Dec. 8, 2007, Table 9.1, p. 32). Therefore, in this embodiment the sound level for a packet that has no speech data is calculated as the number represented by the 5 bits starting from the $43^{rd}$ bit the 11-byte audio packet (i.e., the $35^{th}$ bit of the payload after the 1-byte Flash header). For an audio packet having speech data, the sound level is represented by the 44th bit of the 53-byte audio packet (i.e., the 36th bit of the payload after the 1-byte Flash header).

The sound level of each packet as represented by the indicated 5 bits is compared to a threshold. If the sound level is higher than the threshold, the current packet is declared as active, i.e., generated by voice activity, while if the sound level is lower than the threshold, the packet is declared as inactive. After comparing to the threshold, the sound level of each current packet is also used to update the threshold for comparison with the sound level of subsequent packets.

In one embodiment, the threshold is updated as follows. To approximate the ambient noise level, a value of the "lower envelope" is defined for each audio stream, initialized to the highest sound level that can be represented by the 5 bits, i.e., 31, and then updated by evaluating the sound level of newly arriving packets. The sound level of a newly arrived packet is used to update the value of the lower envelope with the following algorithm:

```
if (currentSoundLevel <= lowerEnvelope)
    lowerEnvelope = currentSoundLevel;
    counter = 0;
else
    counter++;
    if (counter >= 100 && lowerEnvelope < 31)
        lowerEnvelope++;
        counter = 0;
    end
end
```

Thus, in this embodiment the value of the sound level of the lower envelope is in general the minimum sound level observed, a good indication of the level of ambient noise when voice activity is absent. However, the value of the lower envelope is designed to slowly increase if in a relatively long period of time (e.g., 100×20 ms=2 sec) all of the received packets have a sound level higher than the lower envelope. Without this increase, the value of the lower envelope can remain low although the ambient noise level has increased over time.

In one embodiment, the threshold is then derived from the lower envelope using the following algorithm:

```
if (lowerEnvelope > 5)
    threshold = min(lowerEnvelope + 8, 31);
else
    threshold = min(lowerEnvelope + 4 + 4 × (lowerEnvelope/5), 31);
end
```

For a larger value of the lower envelope (sound level >5), the threshold is thus set to 8 levels higher than the value of the lower envelope. This means the sound level of a received packet must be over approximately 20 decibels (dB) louder than the estimated ambient noise to be considered to be an active voice packet. For a smaller value of the lower envelope, i.e., in a quieter environment, the difference between the threshold and the lower envelope is reduced, in some cases to as low as 4 levels, corresponding to a need for the sound level of the packet to be only over about 10 dB greater than the estimated ambient noise to be considered speech.

The values here represent one embodiment, and have been chosen based upon observations of actual use. However, the choice to determine what is speech differently in high and low-ambient-noise environments, and the specific the parameters chosen, i.e., 20 dB in a noisier environment, 10 dB in a quieter environment, and sound level >5 as determining which environments are considered noisy or quiet, are all arbitrary design choices and may be altered if desired, or if other values result in better performance in a specific environment.

If the channel is unoccupied, the audio stream that provides the first received packet that is determined to contain speech is assigned to the channel, and the user on the device that provides that stream is thus the speaker. This prevents more than one user from being heard simultaneously, since one packet will always arrive at the media server first. The channel may be unoccupied at the beginning of a conference, or may become unoccupied after having been occupied as below.

As stated above, once an audio stream occupies the channel, it keeps ownership of the channel as long as additional packets in the stream containing speech are received within a specified period of time that allows for gaps between words that occur in "normal" speech and for the time it takes for the packets to make a round trip between the source computing device and the server. If such additional packets representing speech are not received within such time, then the channel is again considered unoccupied, and the next packet that contains speech takes possession of the channel for the device that originated the packet.

This portion of the method will now be explained in more detail with an example of computer code that may be used to implement a method according to one embodiment of the invention. The following definitions are used:

Current client—The user's computing device that generated an audio packet currently under review to determine whether the packet should be suppressed.

Active—Each audio packet is examined to determine whether its sound level exceeds the threshold, as described above. If the sound level exceeds the threshold, the packet is considered active.

Long—If a packet is active, it is considered long active if at least two out of the three previous packets from the current client are also active.

Rising—If a packet is long active, it is further considered long active and rising if the sound level in the latest three packets has not decreased.

Artifact guard—This is a time duration constant that represents the estimated gap between words and is used to reduce audio artifacts generated by suppressing short segments of low-sound-level samples in a word.

Feedback guard—This is a second time duration value that is derived from the calculated round-trip-time (RTT) from the media server to the user's device that is the origin of a packet being evaluated and is used to ensure that audio packets containing echoes are always suppressed. It may vary over time, and thus in one implementation it is periodically estimated to maintain a current value.

In one embodiment, the Artifact guard is set to 250 ms, and the Feedback guard is set to $2000*(1-\exp(-0.000575*RTT))$. This equation of the Feedback guard is selected so that the Feedback guard value increases with the round-trip-time RTT, but saturates at 2 sec (2000 ms).

The packets are examined in the order received at the server. When the channel is not occupied, e.g. at the beginning of a conference (or because it has been too long since the prior stream occupying the channel sent an active packet as below), and an active packet is received, the stream providing the active packet ("stream A") occupies the channel and the packet is distributed to the other participants in the conference. If the packet is also long active and rising, a clock is updated to indicate the time the packet was received at the server and ownership of the channel by stream A is considered settled. Requiring that the packet be rising, which usually occurs at the beginning of a word, helps to prevent random disturbances from taking over the channel.

Once stream A occupies the channel, if the next packet in stream A is active, it is forwarded to the other participants in the conference. If the packet is long active, and ownership of the channel is settled in stream A, the clock is again updated to the time the packet is received. If ownership is not already settled stream A, it will be considered settled if the packet is also rising. Again, this minimizes the effects of random noises.

If the next packet in stream A is not active, the time the packet is received is compared to the last time an active packet was received. If the non-active packet was received within the Artifact guard time of the last active packet of stream A, then stream A will continue to occupy the channel and the packet will be delivered to the other participants. However, the clock is not updated from the indication of the last active packet. If the time the non-active packet is received is not within the Artifact guard time of the last active packet, the non-active packet is replaced by a zero or comfort packet.

If the channel is already occupied by stream A, and a packet is received in a stream that is not occupying the channel ("stream B"), if the packet in stream B is inactive (i.e., not voice), it is replaced with a zero or comfort packet. If the packet in stream B is active, the time of receipt at the server is compared to the time of the last active packet from stream A. If the time since that last active packet in stream A is less than the sum of the Artifact guard time and the Feedback guard time, the active packet from stream B may represent an acoustic echo of a packet from stream A (played through a speaker and then picked up by the microphone at the device originating stream B), and it is replaced with a zero or comfort packet. This prevents active packets which are echoes from being distributed to the participants in the conference.

On the other hand, if at the time the active packet in stream B is received the elapsed time since the last active packet from stream A is greater than the sum of the Artifact guard time and the Feedback guard time, the active packet in stream B is not an echo but presumably new speech from a different participant than the one previously speaking. In this case stream B replaces stream A as the stream occupying the channel, the active packet in stream B is sent to the other participants in the conference. If the packet is also long active and rising (again to prevent random noises from occupying the channel), the clock is updated to indicate the time the active packet in stream B was received. The process continues as described above, but with stream B now occupying the channel.

An example of this process in one embodiment of the invention is shown by the following code:

```
if (the current client is not the channel owner)
    if (the packet is active)
        if (the channel is not owned (initial stage) or currentTime −
ownerLastActiveTime > (artifact guard + feedback guard))
            Set the channel owner to the current client;
            Forward the current packet;
```

```
            if (the packet is long active and rising)
                Set ownerLastActiveTime to currentTime;
                Set ownershipSettled to true;
            else
                Set ownershipSettled to false;
            end
        else
            Send the silence packet;
        end
    else
        Send the silence packet;
    end
else
    if (the packet is active)
        Forward the current packet;
        if (the packet is long active)
            if (owershipSettled is true)
                Set ownerLastActiveTime to currentTime;
            else
                if (the packet is long active and rising)
                    Set ownerLastActiveTime to currentTime;
                    Set ownershipSettled to true;
                end
            end
        end
    else
        if (currentTime − ownerLastActiveTime < artifact guard)
            Forward the current packet;
        else
            Send the silence packet;
        end
    end
end
```

The invention has been explained above with reference to several embodiments. Other embodiments will be apparent to those skilled in the art in light of this disclosure. Certain aspects of the present invention may readily be implemented using configurations other than those described in the embodiments above, or in conjunction with elements other than those described above. For example, different codecs or APIs may be used, and the values of the various time and sampling parameters may be altered as desired.

It should also be appreciated that the present invention can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc., or a computer network wherein the program instructions are sent over optical or electronic communication links. It should be noted that the order of the steps of the methods described herein may be altered and still be within the scope of the invention.

These and other variations upon the embodiments are intended to be covered by the present invention, which is limited only by the appended claims.

APPENDIX 1

The Speex Codec Manual, Version 1.2 Beta 3, Dec. 8, 2007, Table 10.2, p. 35

TABLE 10.2

Quality versus bit-rate for the wideband encoder

| Mode/Quality | Bit-rate (bps) | Quality/description |
|---|---|---|
| 0 | 3,950 | Barely intelligible (mostly for comfort noise) |
| 1 | 5,750 | Very noticeable artifacts/noise, poor intelligibility |
| 2 | 7,750 | Very noticeable artifacts/noise, good intelligibility |
| 3 | 9,800 | Artifacts/noise sometimes annoying |
| 4 | 12,800 | Artifacts/noise usually noticeable |
| 5 | 16,800 | Artifacts/noise sometimes noticeable |
| 6 | 20,600 | Need good headphones to tell the difference |
| 7 | 23,800 | Need good headphones to tell the difference |
| 8 | 27,800 | Hard to tell the difference even with good headphones |
| 9 | 34,200 | Hard to tell the difference even with good headphones |
| 10 | 42,200 | Completely transparent for voice, good quality music |

APPENDIX 2

The Speex Codec Manual, Version L2 Beta 3, Dec. 8, 2007, Table 9.2, p. 33

9 Speex Narrowband Mode

TABLE 9.2

Quality versus bit-rate

| Mode | Quality | Bit-rate (bps) | mflops | Quality/description |
|---|---|---|---|---|
| 0 | — | 250 | 0 | No transmission (DTX) |
| 1 | 0 | 2,150 | 6 | Vocoder (mostly for comfort noise) |
| 2 | 2 | 5,950 | 9 | Very noticeable artifacts/noise, good intelligibility |
| 3 | 3-4 | 8,000 | 10 | Artifacts/noise sometimes noticeable |
| 4 | 5-6 | 11,000 | 14 | Artifacts usually noticeable only with headphones |
| 5 | 7-8 | 15,000 | 11 | Need good headphones to tell the difference |
| 6 | 9 | 18,200 | 17.5 | Hard to tell the difference even with good headphones |
| 7 | 10 | 24,600 | 14.5 | Completely transparent for voice, good quality music |
| 8 | 1 | 3,950 | 10.5 | Very noticeable artifacts/noise, good intelligibility |
| 9 | — | — | — | reserved |
| 10 | — | — | — | reserved |
| 11 | — | — | — | reserved |
| 12 | — | — | — | reserved |
| 13 | — | — | — | Application-defined, interpreted by callback or skipped |
| 14 | — | — | — | Speex in-band signaling |
| 15 | — | — | — | Terminator code |

APPENDIX 3

The Speex Codec Manual, Version 1.2 Beta 3, Dec. 8, 2007, Table 9.1, p. 32

TABLE 9.1

| Bit allocation for narrowband modes | | | | | | | | | | | |
|---|---|---|---|---|---|---|---|---|---|---|---|
| Parameter | Update rate | 0 | 1 | 2 | 3 | 4 | 5 | 6 | 7 | 8 |
| Wideband bit | frame | 1 | 1 | 1 | 1 | 1 | 1 | 1 | 1 | 1 |
| Mode ID | frame | 4 | 4 | 4 | 4 | 4 | 4 | 4 | 4 | 4 |
| LSP | frame | 0 | 18 | 18 | 18 | 18 | 30 | 30 | 30 | 18 |
| OL pitch | frame | 0 | 7 | 7 | 0 | 0 | 0 | 0 | 0 | 7 |
| OL pitch gain | frame | 0 | 4 | 0 | 0 | 0 | 0 | 0 | 0 | 4 |
| OL Exc gain | frame | 0 | 5 | 5 | 5 | 5 | 5 | 5 | 5 | 5 |
| Fine pitch | sub-frame | 0 | 0 | 0 | 7 | 7 | 7 | 7 | 7 | 0 |
| Pitch gain | sub-frame | 0 | 0 | 5 | 5 | 5 | 7 | 7 | 7 | 0 |
| Innovation gain | sub-frame | 0 | 1 | 0 | 1 | 1 | 3 | 3 | 3 | 0 |
| Innovation VQ | sub-frame | 0 | 0 | 16 | 20 | 35 | 48 | 64 | 96 | 10 |
| Total | frame | 5 | 43 | 119 | 160 | 220 | 300 | 364 | 492 | 79 |

What is claimed is:

1. A method of suppressing echoes in an online audio conference, comprising:
receiving at a server a plurality of audio streams from a plurality of users participating in the conference, each user operating a device that has a microphone and that sends to the server a stream of packets of audio data representing the sound received at the microphone;
testing the packets in the order received at the server to identify the first packet that contains audio data indicative of speech by a user;
designating the stream containing the identified first packet containing speech data as the active stream;
setting the streams other than the active stream to silence; and
distributing the streams to the devices of the identified users.

2. The method of claim 1 wherein the device operated by a user comprises a processor running a web browser and a communication application running within the web browser which generates the stream of packets of audio data from the sound received at the microphone of the device.

3. The method of claim 1 further comprising:
testing subsequent packets in the active stream to see if audio data in the subsequent packets represents speech received at the microphone of the user device within a predefined time of the speech represented in the first identified packet;
if the subsequent packets in the active stream represent speech received at the microphone within the predefined time, maintaining the stream as the active stream; and
if the subsequent packets in the active stream do not represent speech received at the microphone within the predefined time, testing the packets received at the server for the next packet that contains audio data indicative of speech by a user and designating the stream containing the next packet containing audio data as the new active stream.

4. The method of claim 3 wherein the predefined time is set to compensate for gaps between words in speech and for the time needed for packets to make a round trip between the device providing the new active stream and the server.

5. The method of claim 1 wherein testing the packets to identify the first packet that contains audio data indicative of speech by a user comprises calculating the level of the sound represented by the data in the packets and comparing it to a threshold.

6. The method of claim 5 wherein the threshold is adjusted based upon the level of ambient sound at the microphone.

7. The method of claim 1 wherein setting the streams other than the active stream to silence comprises replacing the audio data in the received packets in the other streams with data representing a sound level of zero.

8. The method of claim 1 wherein setting the streams other than the active stream to silence comprises replacing the audio data in the received packets in the other streams with data representing a low level of comfort noise.

9. A system for suppressing echoes in an online audio conference, comprising:
an input means for receiving a plurality of streams of packets of audio data, each stream corresponding to the sound generated by one of a plurality of participants in the conference;
a processor configured to:
test the packets in the order received to identify the first packet that contains audio data indicative of speech by a participant;
designate the stream containing the identified first packet containing speech data as the active stream;
replace the streams other than the active stream with streams of packets representing silence; and
an output means for distributing the streams to the participants.

10. The system of claim 9 wherein each of the streams of packets of audio data are generated by a communication application running within a web browser from the sound received at a microphone of a device running the web browser.

11. The system of claim 9 wherein the processor is further configured to:
test subsequent packets in the active stream to see if audio data in the subsequent packets represents speech received at the microphone of the user device within a predefined time of the speech represented in the first identified packet;
if the subsequent packets in the active stream represent speech received at the microphone within the predefined time, maintain the stream as the active stream; and
if the subsequent packets in the active stream do not represent speech received at the microphone within the predefined time, test the packets received at the server for the next packet that contains audio data indicative of speech by a user and designate the stream containing the next packet containing audio data as the new active stream.

12. The system of claim 11 wherein the predefined time is set to compensate for gaps between words in speech and for the time needed for packets to make a round trip between the device providing the new active stream and the server.

13. The system of claim 9 wherein the processor is further configured to test the packets to identify the first packet that contains audio data indicative of speech by a user by calculating the level of the sound represented by the data in the packets and comparing it to a threshold.

14. The system of claim 13 wherein the threshold is adjusted based upon the level of ambient sound at the microphone.

15. The system of claim 9 wherein the processor is further configured to replace the streams other than the active stream with streams of packets representing silence by replacing the audio data in the received packets in the other streams with data representing a sound level of zero.

16. The system of claim 9 wherein the processor is further configured to replace the streams other than the active stream with streams of packets representing silence by replacing the audio data in the received packets in the other streams with data representing a low level of comfort noise.

17. A non-transitory computer-readable medium having embodied thereon a program, the program being executable by a processor to perform a method comprising the steps of:
    receiving at a server a plurality of audio streams from a plurality of users participating in the conference, each user operating a device that has a microphone and that sends to the server a stream of packets of audio data representing the sound received at the microphone;
    testing the packets in the order received at the server to identify the first packet that contains audio data indicative of speech by a user;
    designating the stream containing the identified first packet containing speech data as the active stream;
    setting the streams other than the active stream to silence; and
    distributing the streams to the devices of the identified users.

\* \* \* \* \*